(12) United States Patent
Koda

(10) Patent No.: US 6,801,614 B1
(45) Date of Patent: Oct. 5, 2004

(54) DIGITAL LOOP CARRIER SYSTEM

(75) Inventor: Eiji Koda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/193,629

(22) Filed: Nov. 17, 1998

(30) Foreign Application Priority Data

Jun. 19, 1998 (JP) ............................................. 10-173548

(51) Int. Cl.$^7$ ................................................. H04M 7/00
(52) U.S. Cl. ..................... 379/221.01; 379/273; 370/16; 370/334
(58) Field of Search ................................. 379/268, 269, 379/272, 273, 221.01, 221.03, 221.04, 333, 335, 334; 370/249, 267, 395, 16, 56

(56) References Cited

U.S. PATENT DOCUMENTS

| | | | | |
|---|---|---|---|---|
| 5,191,456 A | * | 3/1993 | Sutherland et al. | 370/357 |
| 5,287,344 A | * | 2/1994 | Bye et al. | 379/334 |
| 5,436,890 A | * | 7/1995 | Read et al. | |
| 6,031,906 A | * | 2/2000 | Rao | 379/273 |
| 6,160,816 A | * | 12/2000 | Tanaka et al. | 370/467 |
| 6,304,580 B1 | * | 10/2001 | Christie et al. | 370/467 |
| 6,314,103 B1 | * | 11/2001 | Medhat et al. | 370/395.2 |

FOREIGN PATENT DOCUMENTS

| | | |
|---|---|---|
| JP | 4-372241 | 12/1992 |
| JP | 6-269030 | 9/1994 |

* cited by examiner

Primary Examiner—Fan Tsang
Assistant Examiner—Gerald Gauthier
(74) Attorney, Agent, or Firm—Katten Muchin Zavis Rosenman

(57) ABSTRACT

There is provided a remote digital terminal (RDT) which connects digital lines extended from integrated digital terminals(IDTs) with subscriber lines extended from subscribers accommodated in the integrated digital terminals comprising: first means for cross-connecting the digital lines and logic digital lines which are for identifying the digital lines on each of the integrated digital terminals; second means for cross-connecting the subscriber lines and logic subscriber lines which are for identifying the subscriber lines on each of the integrated digital terminals; and third means for cross-connecting the logic digital lines and the logic subscriber lines on each of the integrated digital terminals. Accordingly, the digital lines connected to each of the IDTs can be identified by the first means, and an arbitrary subscriber line can be allocated for an arbitrary logical subscriber by the second means. Furthermore, the first and the second means can be linked together by the third means, so that the IDT digital lines can be linked with the subscriber lines on the subscriber side, and the subscribers can be accommodated by an arbitrary IDT. Therefore, a plurality of IDTs can be connected to one RDT.

3 Claims, 13 Drawing Sheets

FIG. 3

L-SUB /P-SUB CROSS-CONNECT ACM

| Address (Offset) | Data (2 Byte) |
|---|---|
| 0h (P-sub #1) | L-sub# |
| 2h (P-sub #2) | L-sub# |
| ... | ... |
| FFEh (P-sub #2048) | L-sub# |
| 1000h (Monitor control DL#1) | DL L-sub# |
| ... | ... |
| 1006h (Monitor control DL#4) | DL L-sub# |
| 1008h (Call control DL#1) | DL L-sub# |
| ... | ... |
| 100Eh (Call control DL#2) | DL L-sub# |

FIG. 4

L-DS0 /L-SUB CROSS-CONNECT ACM

| Address (Offset) | Data (4 Byte) |
|---|---|
| 0h (RDT#1-L-sub #1) | L-DS0# |
| 4h (RDT#1-L-sub #2) | L-DS0# |
| ⋮ | ⋮ |
| 1EFCh (RDT#1-L-sub#2048) | L-DS0# |
| ⋮ | ⋮ |
| 6000h (RDT#4-L-sub#1) | L-DS0# |
| ⋮ | ⋮ |
| 7FFCh (RDT#4-L-sub #2048) | L-DS0# |
| 8000h (RDT#-monitor control DL sub) | L-DS0# |
| 8004h (RDT#1-L-call control DL sub) | L-DS0# |
| ⋮ | ⋮ |
| 8018h (RDT#4-L-call control DL sub) | L-DS0# |
| 801Ch (RDT#4-L-call control DL sub) | L-DS0# |

FIG. 5

P-DS1/L-DS1 CROSS-CONNECT ACM

| Address (Offset) | Data |
|---|---|
| 0h<br>(L-RDT#1-DS1#1-DS0#1) | P-DS0# |
| 2h<br>(L-RDT#1-DS1#1-DS0#1) | P-DS0# |
| ⋮ | ⋮ |
| 53Eh<br>(L-RDT#1-DS1#28-DS0#24) | P-DS0# |
| ⋮ | ⋮ |
| FC0h<br>(L-RDT#4-DS1#1-DS0#1) | P-DS0# |
| ⋮ | ⋮ |
| 14FEh<br>(L-RDT#4-DS1#28-DS0#24) | P-DS0# |

DIGITAL LOOP CARRIER SYSTEM

BACKGROUND OF THE INVENTION

1. Field of the Invention

The present invention relates to a digital loop carrier system located between a switch and a plurality of subscribers, and in particular to a remote digital terminal employed as part of a digital loop carrier system.

2. Related Arts

In general, a telephone company in North America provides services for subscribers who are scattered over a wide area. In this case, because on average the number of subscribers is low it is uneconomical to provide adequate services by establishing a separate telephone center having a switch for each of a small number of subscribers in a sparsely populated areas. Likewise, if telephone centers are installed for groups comprising economical subscriber numbers, and analog lines are used to connect the telephone centers and the subscribers, the lengths of the individual lines must be extended, a condition which is also not economical.

To resolve this problem, a digital loop carrier system (hereinafter referred to as a DLC system) has come to be employed. FIG. 12 is a specific diagram showing a DLC system. In FIG. 12, the DLC system comprises remote digital terminals (hereinafter referred to as RDTs) 1, which are installed at sites near those of subscribers; and integrated digital terminals (hereinafter referred to as IDTs) 2, which are installed at the telephone center. These RDTs and IDTs are connected by digital lines 3, and normally 28 digital lines are employed between each RDT and IDT.

An IDT 2 converts an analog signal, which is to be transmitted from switch, into a DS0 digital signal (64 bps), and transmits a DS1 digital signal (1.5 Mbps), which is obtained by multiplexing 24 DS0 signals, to the RDT 1 across the digital line 3. The RDT 1 separate the DS1 digital signal to analog signals for the individual subscribers, and distributes them to the subscribers via subscriber analog lines (subscriber channels). This series of procedures constitutes the downstream transmission process. For the upstream transmission, similarly, the RDT 1 converts analog signals received from the subscribers into DS0 digital signals, and then multiplexes the digital signals to produce a DS1 signal which it transmits across the digital line 3 to the IDT 2. Thereafter, from the received DS1 signal the IDT 2 separate DS1 signal to DS0 signals, and converts these signals into analog signals, and transmits them to the switch.

As DLC systems are installed between a switch and the subscribers for each group of subscribers in a specific area, provided is an communication network which efficiently connects the remote subscribers with the switch.

In a conventional DLC system, since they are provided on a one-to-one correspondence basis, an RDT 1 and an IDT 2 are installed as a pair. Therefore, the number of IDTs 2 installed at a telephone center corresponds to the number of RDTs 1 installed in a specific service areas, with the paired RDTs 1 and corresponding IDTs 2 being connected by digital lines 3. The reason that paired RDTs 2 and IDTs 1 are employed lies in the fact that RDTs 1 and IDTs 2 function independently, and were two IDTs 2 connected to a single RDT 1, the RDT 1 would not be able to identify the IDT from which a DS1 signal is received.

To explain the following problem, which may be encountered during the operation of a DLC system, a specific diagram for explaining the objective of the present invention, FIG. 13, is used. Assume, for example, that the maximum number of subscribers that can be accommodated in an RDT 1 is 2000, and that when the number of subscribers serviced in a specific area is unexpectedly increased, the number of the subscribers handled by an RDT 1a and by an RDT 1b differ greatly, with 1900 subscribers, which is close to the maximum, being accommodated by the RDT 1a and 100 subscribers, which is much smaller than the maximum, being accommodated by the RDT 1b.

In this case, the same subscriber variance also affects the IDTs 2a and 2b, which respectively correspond to the RDTs 1a and 1b. Although even when the number of accommodated subscribers is near the maximum, the IDTs 2 perform the minimum required performance, since the imposed load increases as the number of subscribers grows, performance is deteriorated. Furthermore, a situation wherein the number of subscribers accommodated by the IDT 2a is very large and the number of subscribers accommodated by the IDT 2b is very small is also not preferable because of operating stability and load balance requirements. Therefore, to maintain the performance of the IDTs 2 at a constant level or higher, load balances must be adjusted by distributing the subscribers equally between by the IDTs 2a and 2b.

Specifically, the RDT 1a, which accommodates 1900 subscribers, is connected not only to the IDT 2a but also to the IDT 2b, where initially only 100 subscribers are accommodated (see broken line in FIG. 13), and, for example, of the 1900 subscribers accommodated by the RDT 1a 900 are now serviced by the IDT 2b. As a result, an equal number of 1000 subscribers each can be distributed to the IDTs 2a and 2b.

However, as is described above, the RDT 1 and the IDT 1 are installed on a one-to-one correspondence basis, and a problem is that the RDT 1 can not be connected to a plurality of IDTs.

SUMMARY OF THE INVENTION

To resolve this problem, it is one objective of the present invention to provide a remote digital terminal (RDT) which can be connected to a plurality of integrated digital terminals (IDTs) included in a digital loop carrier (DLC).

To achieve the above objective, according to the present invention, Provided is a remote digital terminal (RDT) which connects digital lines extended from integrated digital terminals with subscriber lines extended from subscribers accommodated in the integrated digital terminals comprising:

first means for cross-connecting the digital lines and logic digital lines which are for identifying the digital lines on each of the integrated digital terminals;

second means for cross-connecting the subscriber lines and logic subscriber lines which are for identifying the subscriber lines on each of the integrated digital terminals; and third means for cross-connecting the logic digital lines and the logic subscriber lines on each of the integrated digital terminals.

Specifically, the digital lines connected to each of the IDTs can be identified by the first means, and an arbitrary subscriber line can be allocated for an arbitrary logical subscriber by the second means. Furthermore, the first and the second means can be linked together by the third means, so that the IDT digital lines can be linked with the subscriber lines on the subscriber side, and the subscribers can be accommodated by an arbitrary IDT. Therefore, a plurality of IDTs can be connected to one RDT.

More specifically, to achieve the above objective, according to the present invention, provided is a remote digital terminal (RDT) which connects with digital lines extended from integrated digital terminals and subscriber lines extended from subscribers accommodated in the integrated digital terminals comprising:

a terminator for terminating a first digital line extended from a first integrated digital terminal and a second digital line extended from a second integrated digital terminal; and a cross-connector for cross-connecting the first digital line and a first subscriber line extended from a first subscriber accommodated in the first integrated digital terminal, and for cross-connecting the second digital line and a second subscriber line extended from a second subscriber accommodated in the second integrated digital terminal.

In addition, the thus arranged remote digital terminal further comprises:

first data for corresponding first physical identifiers for physically identifying the first and second digital line with first logic identifiers for identifying the first and second digital line on each of integrated digital terminals;

second data for corresponding second physical identifiers for physically identifying the first and second subscriber line with second logic identifiers for identifying the first and second subscriber lines on each of integrated digital terminals;

third data for corresponding the first logic identifiers with the second logic identifiers; and a processor for obtaining data for corresponding the first physical identifiers with the second physical identifiers based on the first, second and third data; and wherein the cross-connector cross-connects the first and second digital lines with the first and second subscriber lines respectively based on the results obtained by the processor.

Other features and advantages of the present invention will become readily apparent from the following description when taken in conjunction with the accompanying drawings.

BRIEF DESCRIPTION OF THE DRAWINGS

FIG. 3 is a diagram showing example data which are stored in a L-sub/P-sub cross-connect ACM;

FIG. 4 is a diagram showing example data which are stored in a L-DS0/L-sub cross-connect ACM;

FIG. 5 is a diagram showing example data which are stored in a P-DS1/L-DS1 cross-connect ACM;

DETAILED DESCRIPTION OF THE PREFERRED EMBODIMENT

The preferred embodiment of the present invention will now be described. It should be noted, however, that the technical scope of the present invention is not limited to this embodiment.

Figure 1:
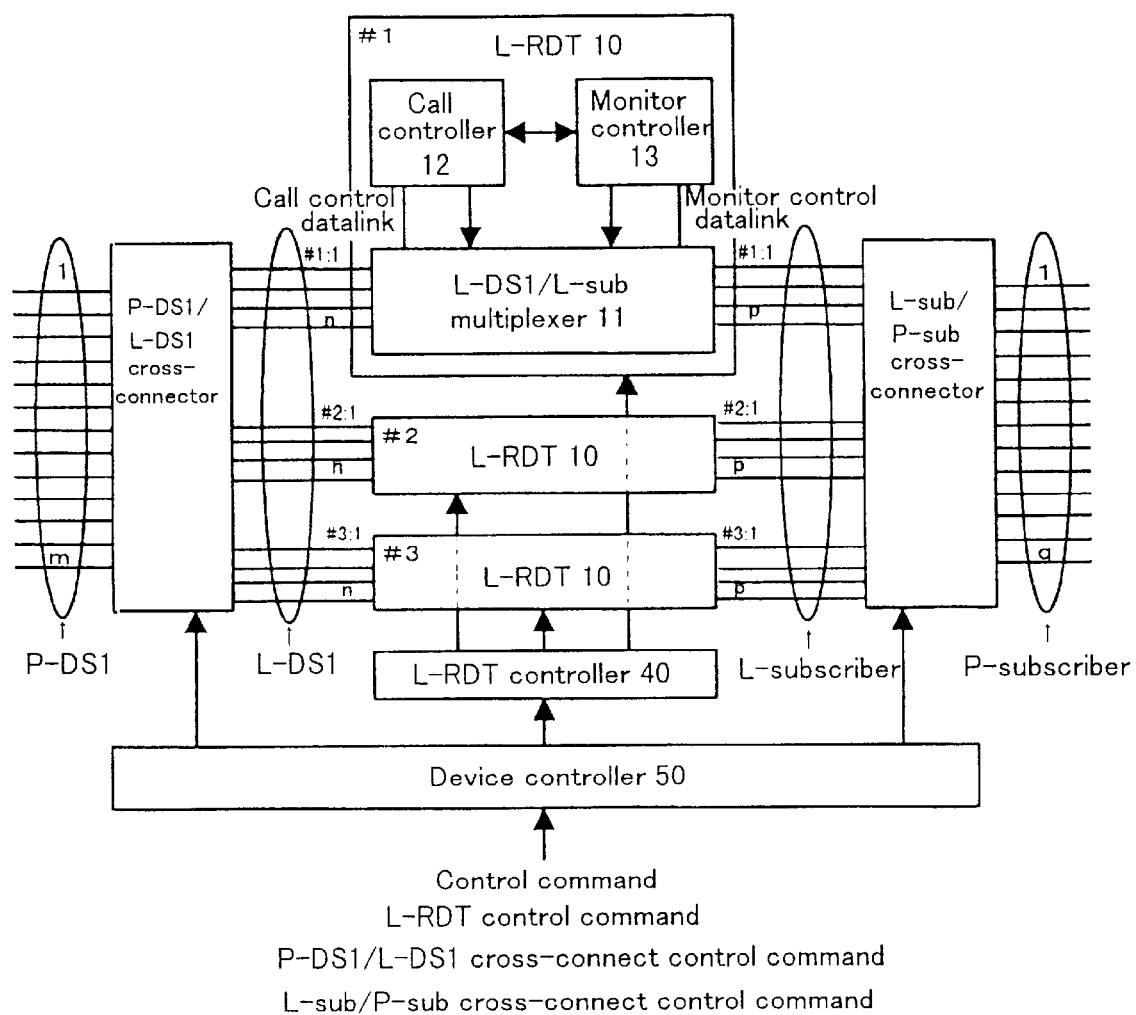
FIG. 1 is a functional block diagram illustrating a remote digital terminal (RDT) employed in a DLC system according to one embodiment of the present invention.

FIG. 1 is a functional block diagram illustrating a remote digital terminal (RDT) employed in a DLC system according to one embodiment of the present invention. In this embodiment, an RDT in FIG. 1 has a virtual logical RDT section (L-RDT) 10 for each of a plurality of integrated digital terminals (IDTs) (not shown). The DS1 signals transmitted from the individual IDTs are separated by corresponding L-RDTs 10 to obtain DS0 signals. The DS0 signals are converted into analog signals, which are then distributed to subscribers (not shown). Analog signals from the subscribers are converted into DS0 signals by the L-RDTs 10, which individually correspond to the IDTs accommodating specific subscribers, and the DS0 signals are multiplexed to obtain a DS1 signal. The DS1 signals are transmitted to the IDTs which correspond to the individual L-RDTs 10. In FIG. 1 are shown three L-RDTs 10 which correspond to three IDTs.

Furthermore, the RDT in this embodiment comprises a physical DS1 (P-DS1)/logical DS1 (L-DS1) cross-connector 20 for cross-connecting real lines (hereinafter referred to as physical DS1s (P-DS1s) lines) along which DS1 signals are exchanged with the IDTs (not shown), and virtual lines (hereinafter referred to as logical DS1s(L-DS1) lines) which correspond to the. L-RDTs 10; and a logical subscriber (L-sub)/physicai subscriber(P-sub) cross-connector 30 for cross-connecting real lines (hereinafter referred to as physical subscriber(P-sub) lines) across which analog signals are exchanged with subscribers (not shown), and virtual lines (hereinafter referred to as logical subscriber(L-sub) lines), which correspond to the L-RDTs 10.

That is, in FIG. 1, the P-DS1/L-DS1 cross-connector 20 converts P-DS1 numbers of, for example, 1 to m into L-DS1 numbers (#1: 1-n, #2: 1-n, . . . ) which are provided for L-RDTs (#1, #2, . . . ) 10 and correspond to the IDTs. As a result, a DS1 signal transmitted by one of the IDTs can be distributed to a corresponding L-RDT 10, and the P-DS1 for each of the IDTs can be identified.

In addition, in FIG. 1, the L-sub/P-sub cross-connector 30 converts P-sub numbers of, for example, 1 to q into L-RDT numbers (#1: 1-p, #2: 1-p, . . . ) which are provided for L-RDTs (#1, #2, . . . ) 10. As a result, an analog signal transmitted by a subscriber can be distributed to the L-RDT 10 which corresponds to an IDT whereby the subscriber is accommodated. Therefore, an arbitrary P-sub can be assigned to an arbitrary L-sub.

The L-RDT 10 includes a L-DS1/L-sub multiplexer 11 for multiplexing a L-sub to obtain a L-DS1; and a call controller 12 and a monitor controller 13 for controlling the multiplexer 11. The L-DS1/L-sub multiplexer 11 converts a L-sub signal into a logical DS0(L-DS0), and multiplexes 24 L-DS0s to obtain a L-DS1. Accordingly, the multiplexer 11 functions as a cross-connector.

The call controller 12 communicates with the switch via a call control DataLink, and upon each issuance of a call, reception of a call and end of a speech, multiplexes the L-sub to obtain a L-DS0 which designates the switch. The monitor controller 13 communicates with the switch via a monitor control DataLink, and under the control of the switch assigns the L-sub to the L-DS0.

The RDT in the embodiment further comprises a L-RDT controller 40 for controlling the operations of the L-RDTs 10, and a device controller 50 for processing a control command and for controlling the L-RDTs 10, the P-DS1/L-DS1 cross-connector 20, and the L-sub/P-sub cross-connector 30. The operations of the L-RDT controller 40 and the device controller 50 will be described in detail later.

In the RDT in this embodiment, for a downstream transmission DS1s transmitted by a plurality of IDTs are distributed to the corresponding L-RDTs 10 by the P-DS1/L-DS1 cross-connector 20. Then, the L-RDTs 10 separates the DS1s to obtain DS0s which it converts into analog signals. The analog signals are then distributed by the L-sub/P-sub cross-connector 30 to subscribers which are accommodated by the IDTs corresponding to the L-RDTs 10.

For an upstream transmission, first, analog signals from the subscribers are distributed by the L-sub/P-sub cross-connector 30 to the L-RDTs 10 which correspond to the IDTs whereby these subscribers are accommodated. The L-RDTs 10 convert the analog signals into DS0s, and multiplex them to obtain a DS1. The multiplexed DS1 is then distributed by the P-DS1/L-DS1 cross-connector 20 to the IDTs which correspond to the L-RDTs 10.

As is described above, since the RDT in this embodiment includes the P-DS1/L-DS1 cross-connector 20, the L-sub/P-sub cross-connector 30 and the L-DS1/L-sub multiplexer 11 provided for each IDT, the RDT can identify each of a plurality of IDTs which are connected to the RDT. Therefore, when the number of subscribers accommodated by each of a plurality of IDTs differs (the load is poorly balanced), part of the subscribers supported by one IDT can be shifted and accommodated by another IDT, and an RDT connected to one IDT can also be connected to another IDT. As a result, it is possible to balance a load among a plurality of IDTs.

Furthermore, since a plurality of IDTs can be connected to one RDT, and thus even a plurality of IDTs which are installed in different telephone centers (i.e., which are connected to different switches) can be connected to one RDT, the following operational implementation is possible. Assume that an original communication service company has installed an IDT in their telephone center in their service area and has installed an RDT which is to be connected to the IDT, and that a new communication service company is set up to begin to provide a new communication service in the business area already serviced by the original communication service company. In this case, as far as cost is concerned it is very difficult for the new communication service company to introduce all the equipment required for their business. Therefore, what has recently occurred in North America is that an original communication service company has been required to permit a startup company to employ their installed communication equipment by tapping into their system at an arbitrary, technically feasible connection point. In this case, the most practical connection point is at an RDT.

At the present, as is described above, a conventional RDT can be connected to only one IDT, even when the number of subscribers involved has reached the maximum which can be accommodated. Therefore, a conventional RDT, which is already connected to the IDT (the original IDT) installed in the telephone center of the original communication service company, can not be connected to an IDT (a new IDT) installed in the telephone center of the new communication service company. As a result, in response to a connection request submitted by the new communication service company, the original communication service company must set up another RDT that can be connected to the new IDT. This imposes a large financial burden on the original communication service company.

However, since the RDT in this embodiment can be connected to a plurality of IDTs, in response to a connection request from the new communication service company, the original company can connect such an RDT to both the old IDT and to the new IDT, and thus not incur a large financial burden as a result of the load imposed by the requirements of the new communication service company.

Figure 2:
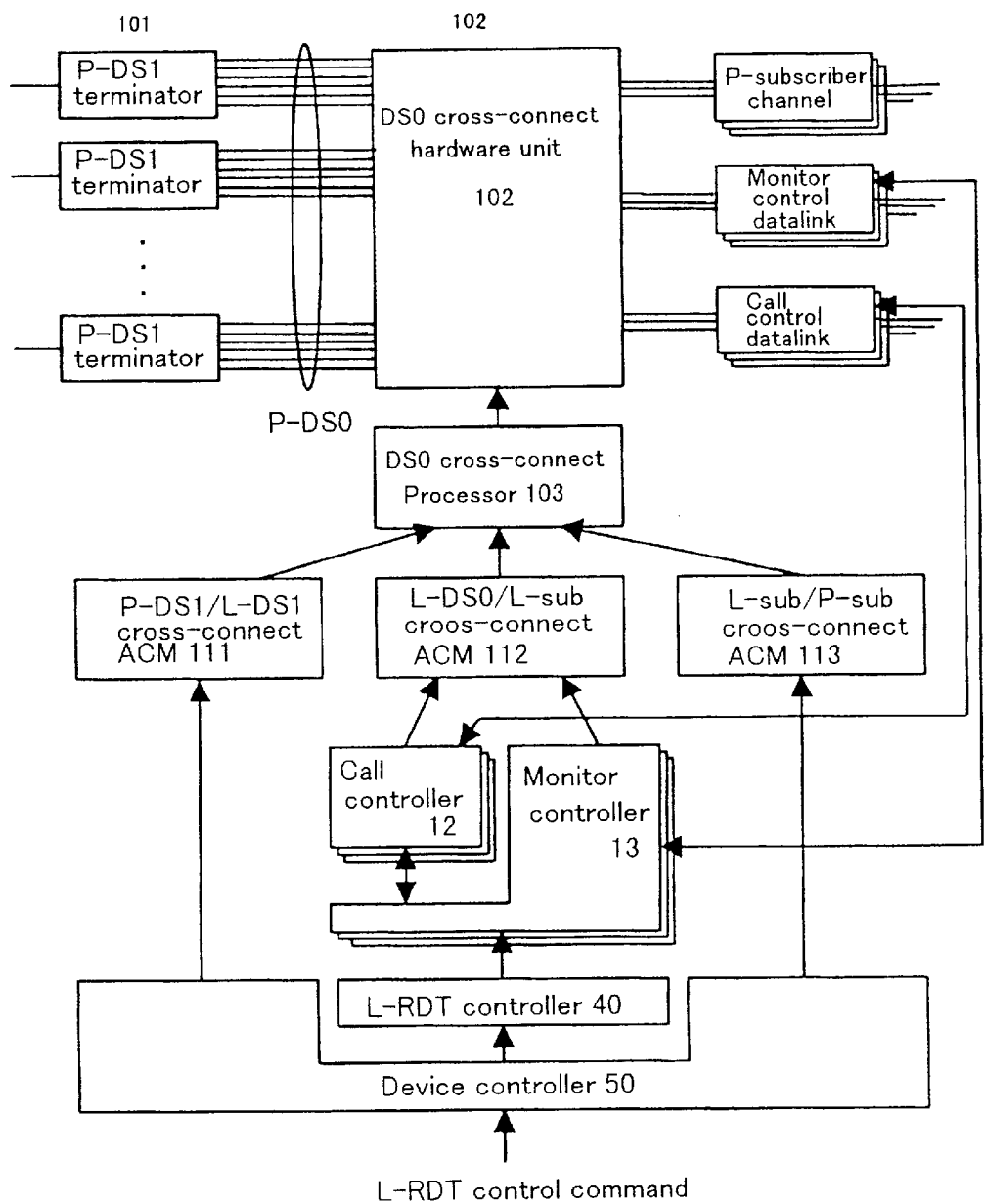
FIG. 2 is a specific diagram illustrating the arrangement of the RDT in FIG. 1 according to the embodiment of the present invention.

FIG. 2 is a specific diagram illustrating the arrangement of the RDT in FIG. 1 according to the embodiment of the present invention. In FIG. 2, a P-DS1/L-DS1 cross-connect ACM (Access Control Memory) 111 corresponds to the P-DS1/L-DS1 cross-connector 20 in FIG. 1; a L-DS0/L-sub cross-connect ACM 112 corresponds to the L-DS1/L-sub multiplexer 11 in FIG. 1; and the L-sub/P-sub cross-connect ACM 113 corresponds to the L-sub/P-sub cross-connector 30 in FIG. 1.

P-DS1 terminators 101 terminate the P-DS1 lines and separate the P-DS1 to obtain the P-DS0s, and multiplex the P-DS0s to obtain the P-DS1. The P-DS0 lines divided among the P-DS1 terminators 101, the P-sub lines, the monitor control DataLinks, and the call control DataLinks are cross-connected by a DS0 cross-connection hardware unit (DS0 cross-connector) 102. The P-sub lines are connected to the individual subscribers, the monitor control DataLinks are connected to the monitor controller 13, and the call control DataLinks are connected to the call controller 12.

The DS0 cross-connector 102 is controlled by a DS0cross-connection processor (hereinafter referred to simply as a processor) for calculating data stored in the ACMs 111, 112 and 113.

FIGS. 3 to 5 are diagrams showing example data stored in the L-sub/P-sub cross-connect ACM 113, the L-DS0/L-sub cross-connect ACM 112 and the P-DS1/L-DS1 cross-connect ACM 111.

First, as is shown in FIG. 3, in the L-sub/P-sub cross-connect ACM 113, addresses correspond to the P-sub numbers, to the numbers of the monitor control DataLinks, and to the numbers of the call control DataLinks. The data are the L-sub numbers which correspond to the P-subs. In this embodiment, the numbers of the monitor control DataLink (DL) and the call control DataLink (DL) are also processed as one type of P-subs, and these data are also provided as DL L-sub numbers.

As is shown in FIG. 4, in the L-DS0/L-sub cross-connect ACM 112, the addresses correspond to the L-subs (including DL (DataLink) L-subs), and data are L-DS0 numbers. At this time, the L-subs, which are addresses in FIG. 4, are identified using four L-RDTs, and the L-sub numbers accommodated by these RDTs. The addresses in FIG. 4 are provided as values, for example, of four times the L-sub numbers, which constitute the data in FIG. 3.

The processor 103 obtains the L-sub numbers from the addresses of the P-subs in FIG. 3. The processor 103 multiples the L-sub numbers by four to obtain the addresses in FIG. 4, and thereafter acquires the L-DS0numbers from the obtained addresses.

As is shown in FIG. 5, in the P-DS1/L-DS1 cross-connect ACM 111, the addresses correspond to the L-DS0lines, and the data are P-DS0 numbers. The L-DS0 lines which are addresses in FIG. 5 are identified by four RDTs, the numbers of 28 L-DS1s provided for individual L-RDTs, and the numbers of 24 L-DS0s which are multiplexed to obtain the L-DS1. The addresses in FIG. 5 are provided as values, for example, of twice the L-DS0 numbers in FIG. 4.

Therefore, the processor 103 obtains a address in FIG. 5 by multiplying by two the number of the L-DS0 line acquired above, and obtains the number of a P-DS0 line from the obtained address. The DS0 cross-connector 102 cross-connects the P-sub lines and the P-DS0 lines, which are obtained through the above processing performed by the processor 103.

A predetermined disconnection code is set, as data corresponding to addresses, for the individual ACMs until the connection control which will be described later is exercised.

Figure 6:
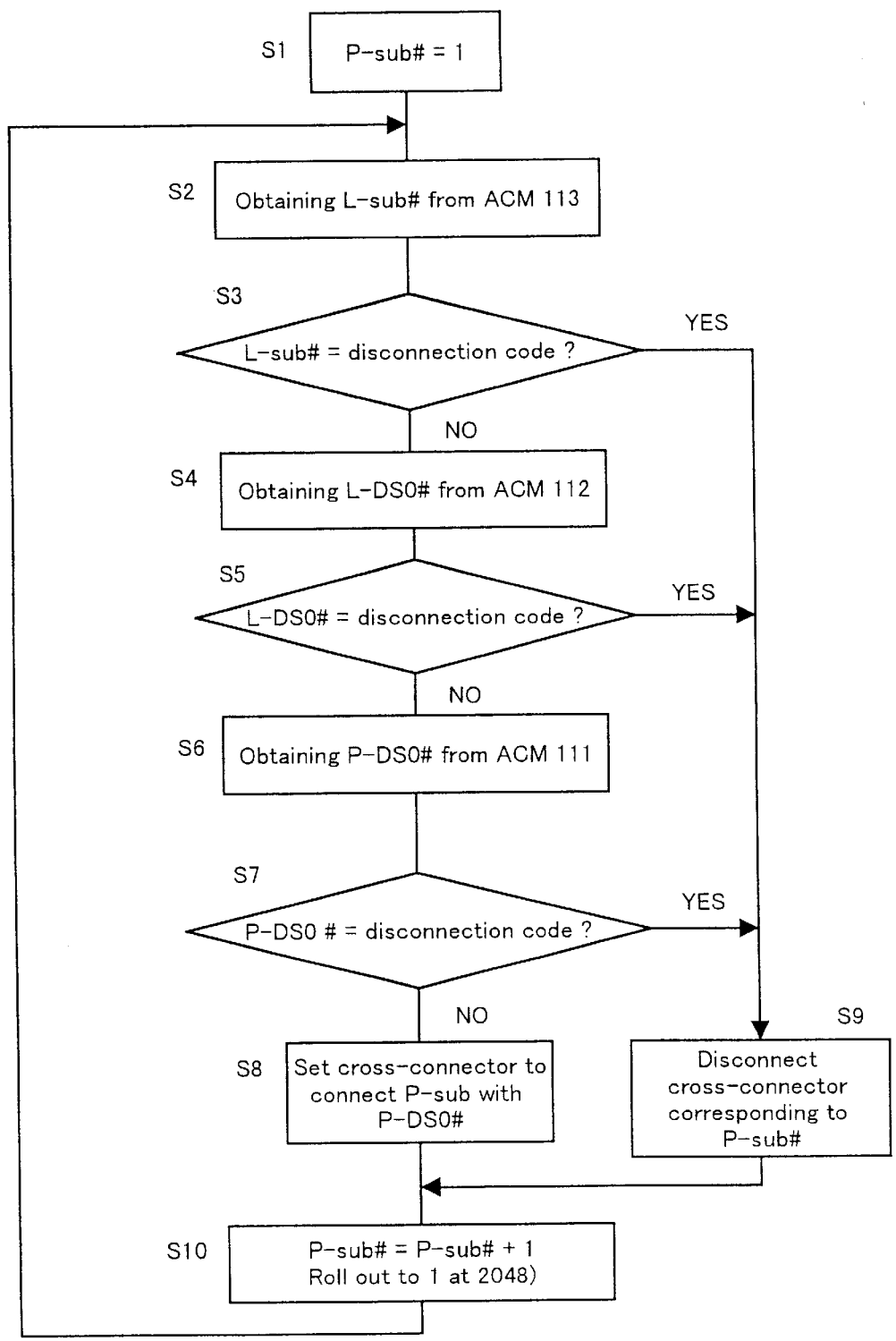
FIG. 6 is a flowchart showing the processing performed by a DS0 cross-connection processor.

FIG. 6 is a flowchart showing the processing performed by the processor 103. A step S1 the processing is started at P-sub number #1. At step S2 the processor 103 obtains data corresponding to the address of the P-sub number from the P-sub/L-sub cross-connect ACM 113.

When, at step S3, the obtained data are not the L-sub number but constitute a disconnection code, at step S9 the processor 103 disconnects the DS0 cross-connector 102 which corresponds to the P-sub number.

When, at step S3, the obtained data is a L-sub number, the processor 103 multiplies the L-sub number to obtain the L-sub number address in the L-DS0/L-sub cross-connect ACM 112. At step S4 the processor 103 obtains data corresponding to the address of the L-sub number.

When, at step 5, the obtained data are not L-DS0 2 data but are disconnection data, at step S9 the processor 103 disconnects the DS0 cross connector 102 which corresponds to the P-sub number.

When, at step 5, the obtained data constitute a L-DS0 number, the processor 103 multiplies the L-DS0 number by two to obtain the L-DS0 number in the P-DS0/L-DS0 cross-connection ACM 111. At step S6 the processor 103 obtains data corresponding to the address of the L-DS0 number.

When, at step S7, the obtained data are not P-DS0data but constitute a disconnection code, at step S9 the processor 103 disconnects the DS0 cross-connector 102 corresponding to the P-sub number.

When, at step S7, the obtained data constitute a P-DS0number, the processor 103 sets the cross-connector 102 in order to connect the P-sub number and the P-DS0 number.

At step S10 the processor 103 increments the P-sub number by one, and repeats the processing at step S1 to step S9 for the next P-sub number. This processing is repeated until P-sub number #2048, the greatest subscriber number that can be accommodated, is reached.

The control provided for the RDT in this embodiment will now be explained.

First, the L-RDT 10, which is virtually located in the RDT in this embodiment, is set to the active state (Enabled).

Figure 7:
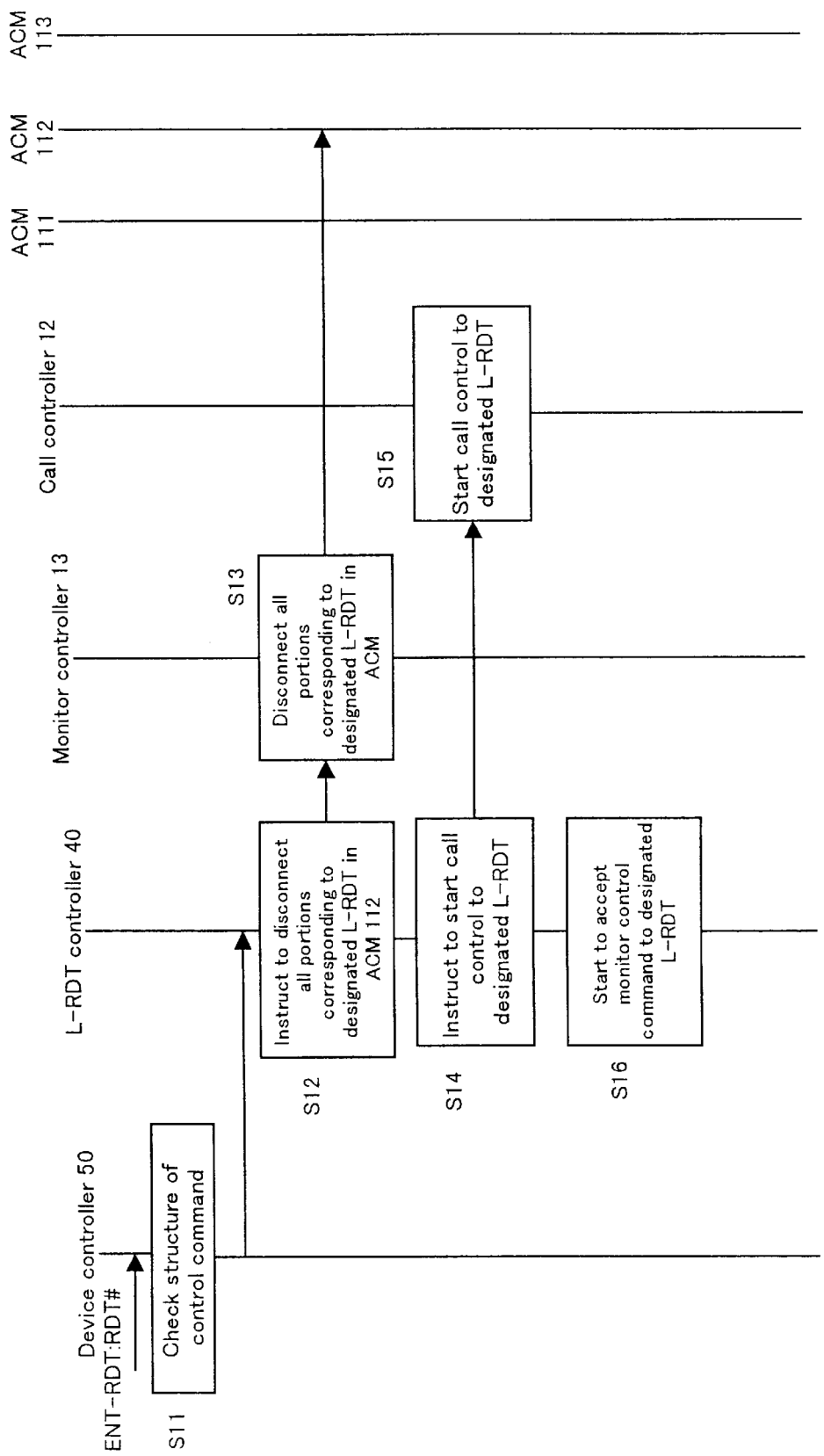
FIG. 7 is a flowchart showing the processing for setting the state of a L-RDT to enabled.

FIG. 7 is a flowchart showing the processing for setting the L-RDT 10 to the active state. In FIG. 7, first, a control command including L-RDT number (#), ENT-RDT::RDT#, is input to the device controller 50. The device controller 50 checks the structure of the control command (step S11), and transmits the control command to the L-RDT controller 40.

At step S12 the L-RDT controller 40 transmits an instruction to the monitor controller 13 in the L-RDT 10, which is designated by the control command, to disconnect all portions, of the L-DS0/L-sub cross-connect ACM 112, which correspond to the designated L-RDT 10. Specifically, the L-RDT controller 40 transmits, to the monitor controller 13 of the designated L-RDT 10, an instruction to change to disconnection code data, which is designated by the control command, for the L-RDT 10.

Then, at step S13, upon receiving the instruction the monitor controller 13 sets, to disconnection code, all the data which correspond to the L-RDT 10 designated by the control command.

At step S14 the L-RDT controller 40 instructs the call controller 12 of the designated L-RDT 10 to start the call control. At step S15, upon receipt of the instruction, the call controller 12 initiates the call control. In addition, at step S16 the L-RDT controller 40 initiates the acceptance of a monitor control command for the designated L-RDT 10. As a result, the L-RDT 10 is set to the active state (Enabled).

Figure 8:
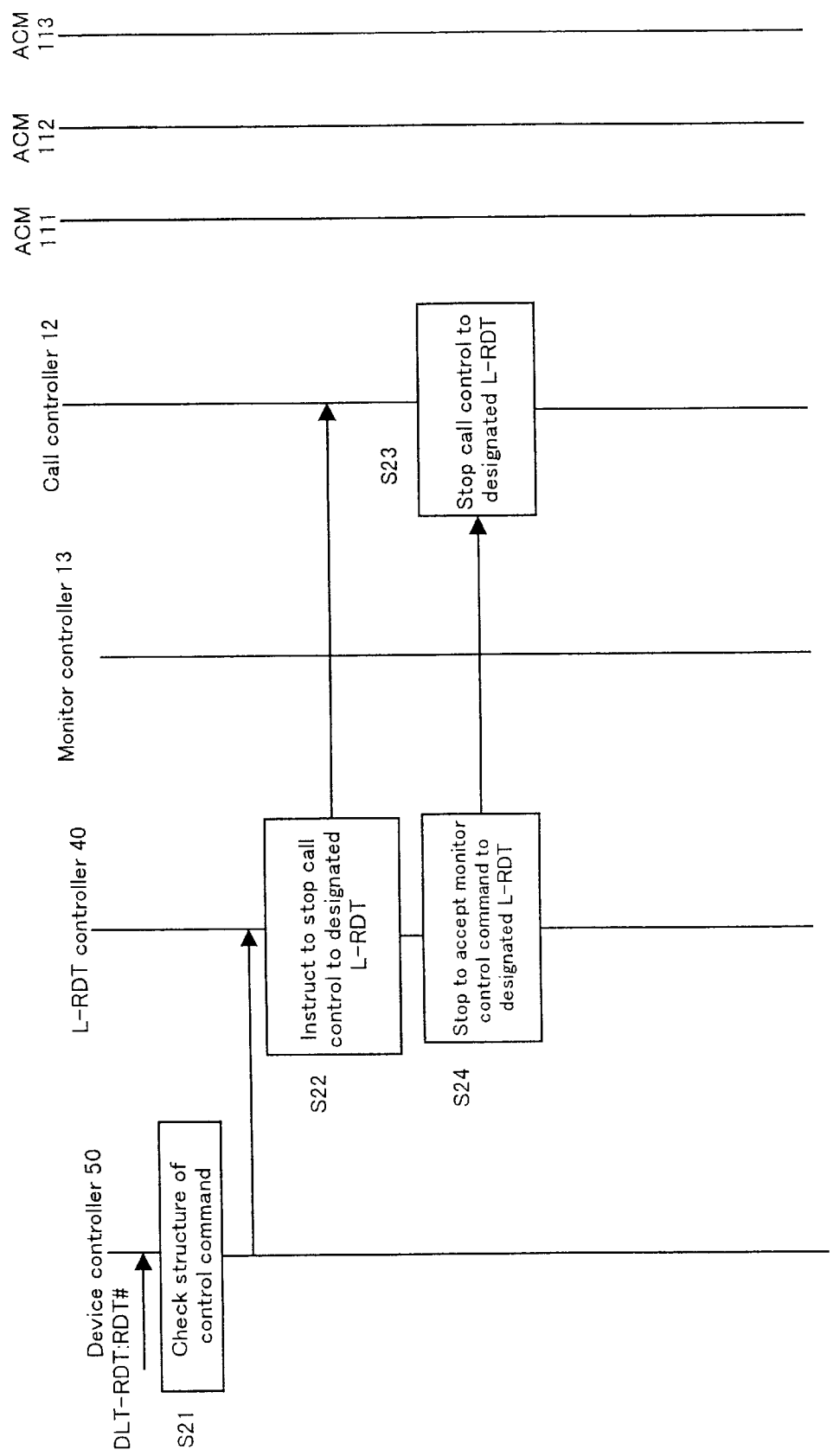
FIG. 8 is a flowchart showing the processing for setting the state of a L-RDT to disabled.

FIG. 8 is a flowchart showing the processing for setting the L-RDT 10 to an inactive state (Disabled). In FIG. 8, first, a control command including L-RDT number (#) DLT-RDT::RDT# is input to the device controller 50. The device controller 50 checks the structure of the control command (step S21), and transmits the control command to the L-RDT controller 40.

At step S22 the L-RDT controller 40 instructs the call controller 12 of the designated L-RDT 10 to halt the call control process. At step S23 upon receipt of the instruction, the call controller 12 halts the call control process. At step S24 the L-RDT controller 40 halts the acceptance of monitor control commands for the designated L-RDT 10. As a result, the L-RDT 10 is set to the inactive state (Disable).

Figure 9:
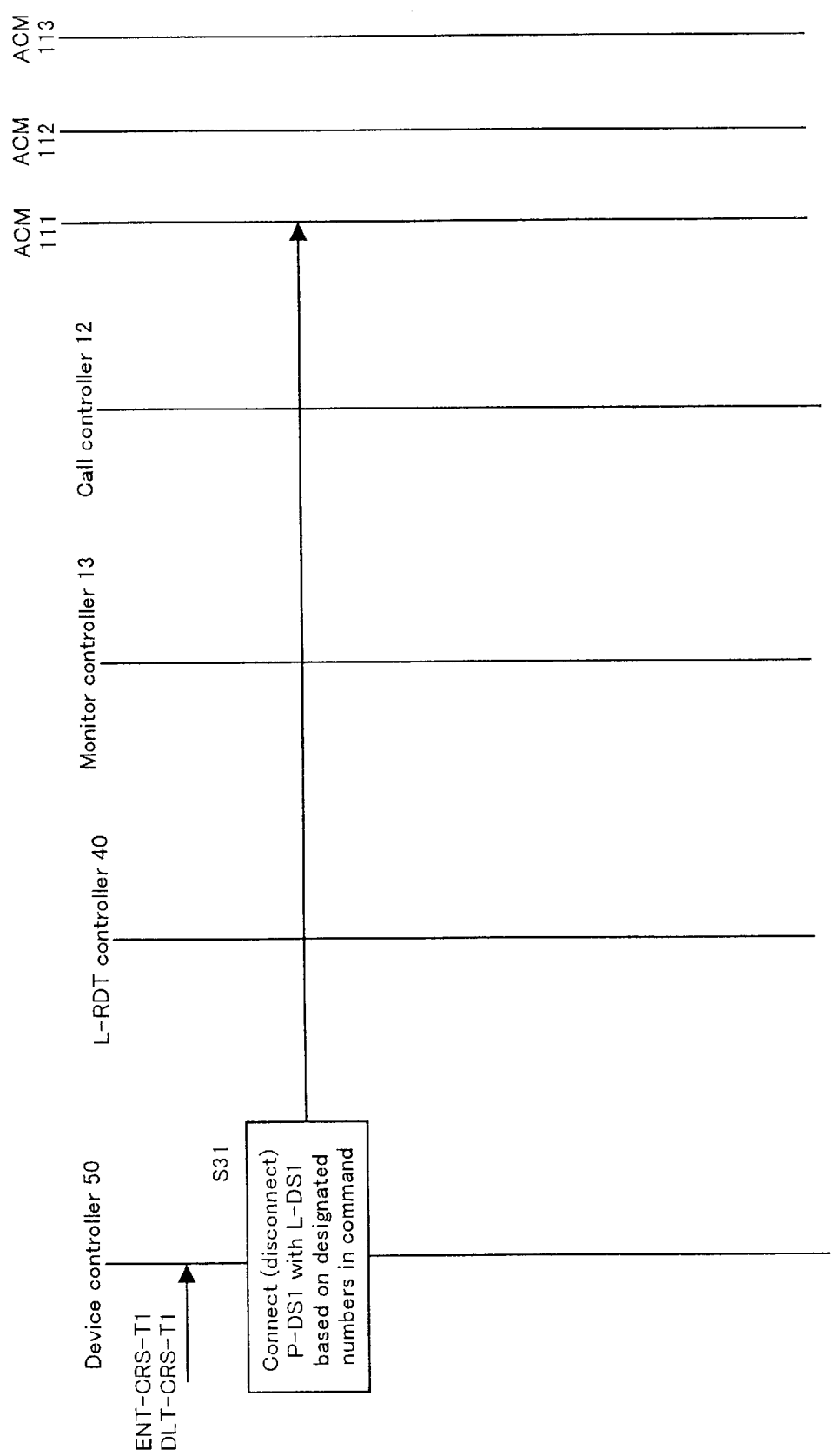
FIG. 9 is a flowchart showing the processing for connecting or disconnecting a P-DS1/L-DS1 cross-connect ACM.

FIG. 9 is a flowchart showing the processing for the connection and the disconnection of the P-DS1/L-DS1 cross-connection ACM 111. In FIG. 9, for a connection, the device controller 50 receives a connection command (ENT-CRS-T1::<physical DS1#>, <L-RDT#>−<logic DS1#>) which designates a physical DS1 number (#) and a logic DS1 number (#) which is provided for each L-RDT number (#) and for each L-RDT 10. At step S31 the device controller 50 connects the P-DS1s having the designated number to the L-DS1s having the designated number. In FIG. 5, data are stored as DS0 units in the P-DS1/L-DS1 cross-connect ACM 111, while the connection command is stored as DS1 units. Therefore, the (P-/L-) DS0, which belong to the (P-/L-) DS1s designated by the control command, are collectively connected.

For a disconnection, the device controller 50 receives a disconnection command (DLT-CRS-T1::<P-DS1#> (or DLT-CRS-T1::<L-RDT#>−<L-DS1#>)). Since for disconnection control, unlike for connection control, one number is specified when another is designated, only one number is designated in the disconnection command. Based on the disconnection command, the device controller 50 disconnects the (P-/L-) DS0 lines which belong to the (P-/L-) DS1 lines having the designated numbers (step S31).

Figure 10:
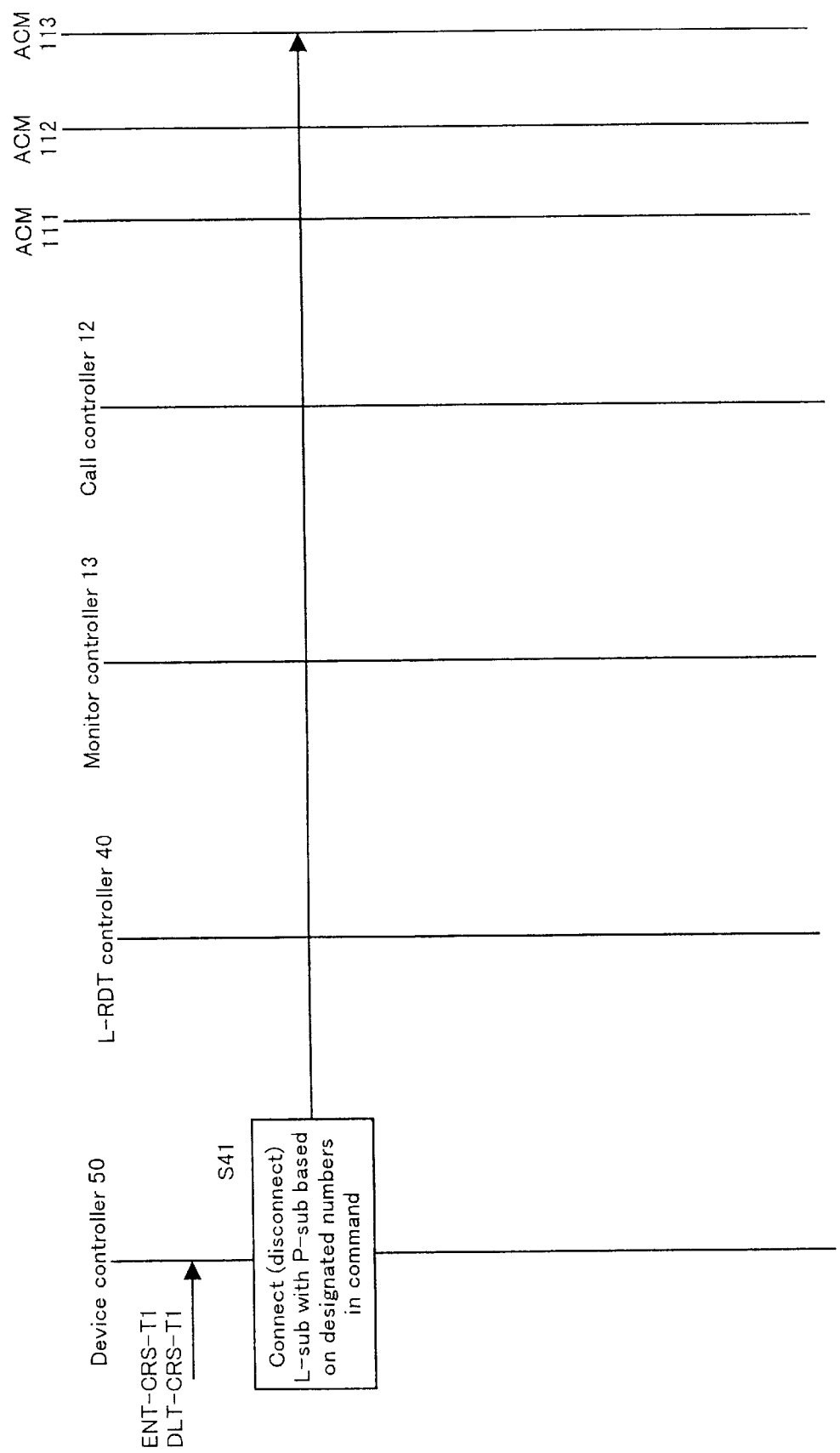
FIG. 10 is a flowchart showing the processing for connecting or disconnecting a L-sub/P-sub cross-connect ACM.

FIG. 10 is a flowchart showing the processing for the connection and the disconnection of the L-sub/P-sub cross-connect ACM 113. In FIG. 10, for a connection the device controller 50 receives a connection command (ENT-CRS-T1::<L-RDT#>−<L-sub#>, <P-sub#>) designating a physical subscriber number (#) and a L-sub number (#) which is provided for each L-RDT number and each L-RDT. At step S41, the device controller 50 connects the L-sub having the designated number to the P-sub having the designated number.

For a disconnection, the device controller 50 receives a disconnection command (DLT-CRS-T1::<L-RDT#>−<L-sub#> (or DLT-CRS-T1::<P-sub#>)). As is described above, for disconnection control, unlike for connection control, since one number can be specified by designating the other number, only one number is designated for the disconnection command. Based on this disconnection command, the device controller 50 disconnects the logic subscriber having the designated number from the physical subscriber having the designated number (step S41).

Figure 11:
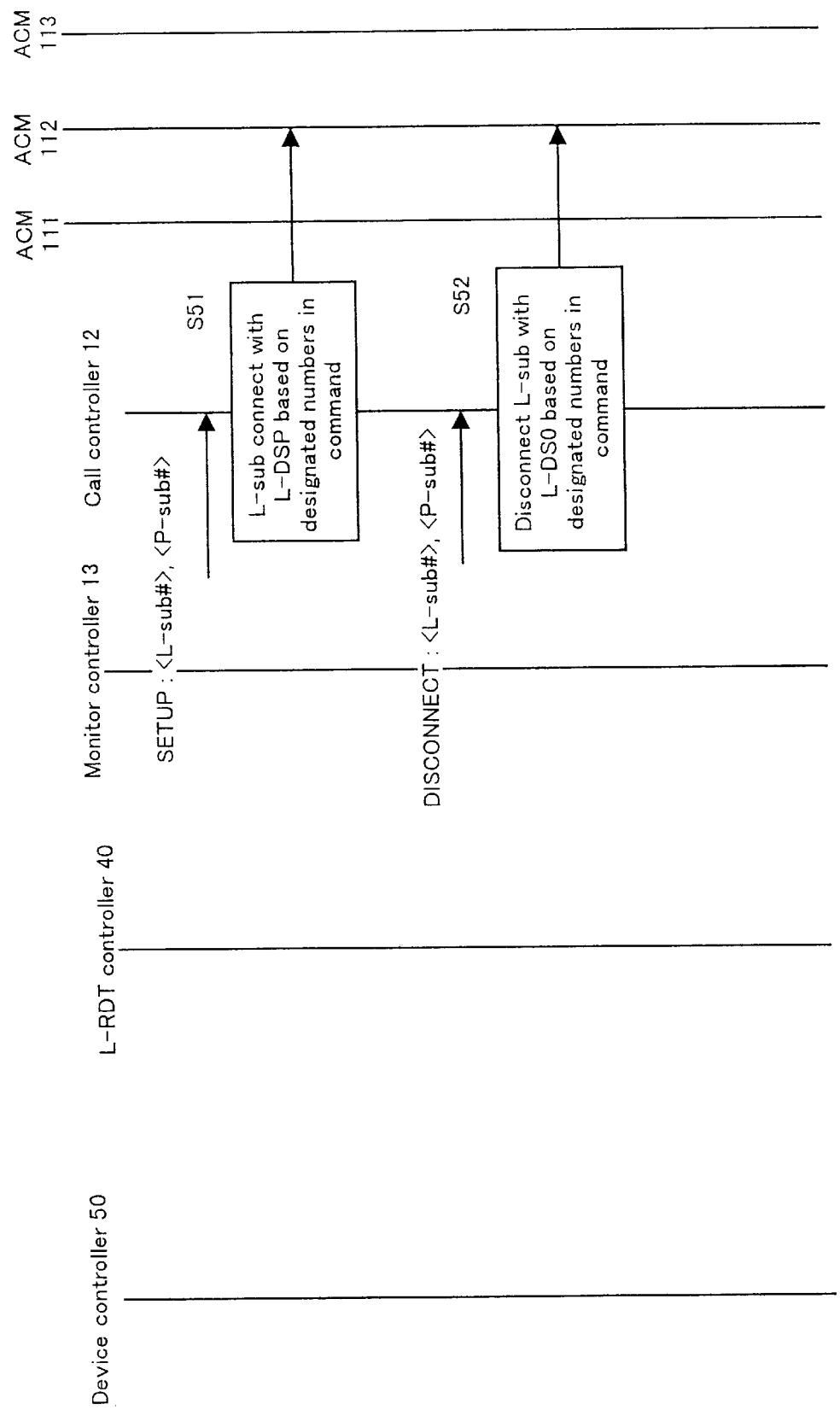
FIG. 11 is a flowchart showing the processing for connecting or disconnecting a L-DS0/L-sub cross-connect ACM.
Figure 12:
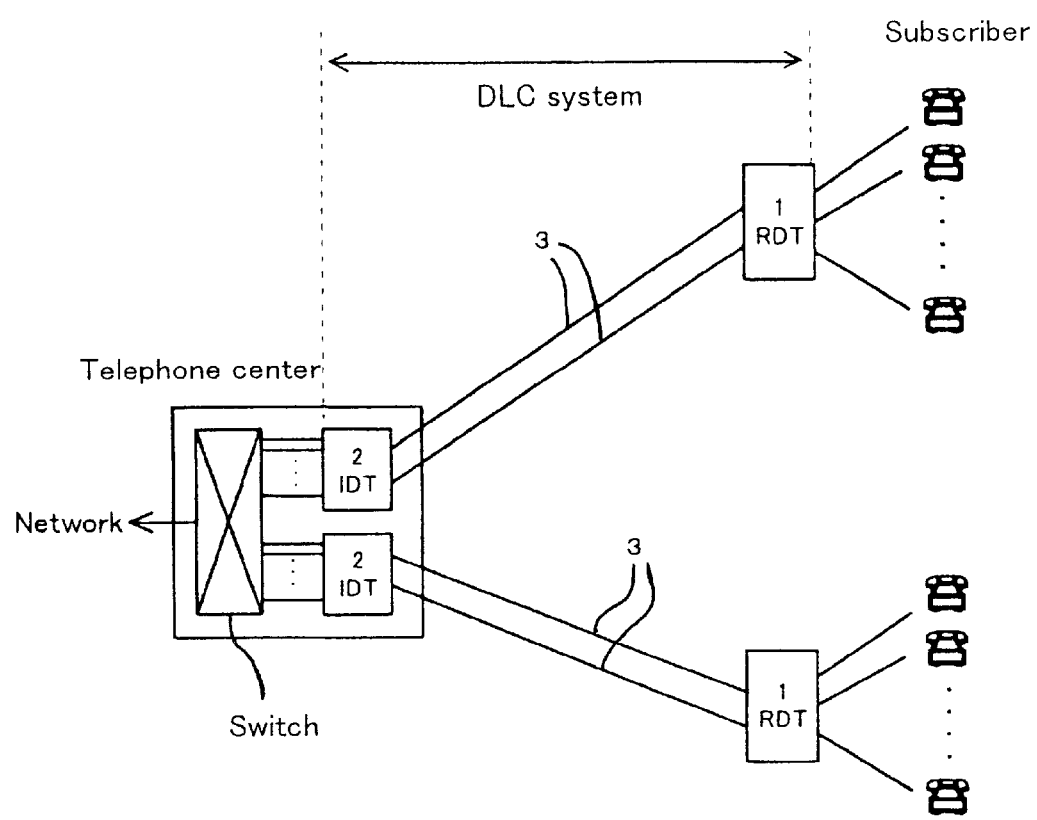
FIG. 12 is a specific diagram showing a digital loop carrier (DLC) system.
Figure 13:
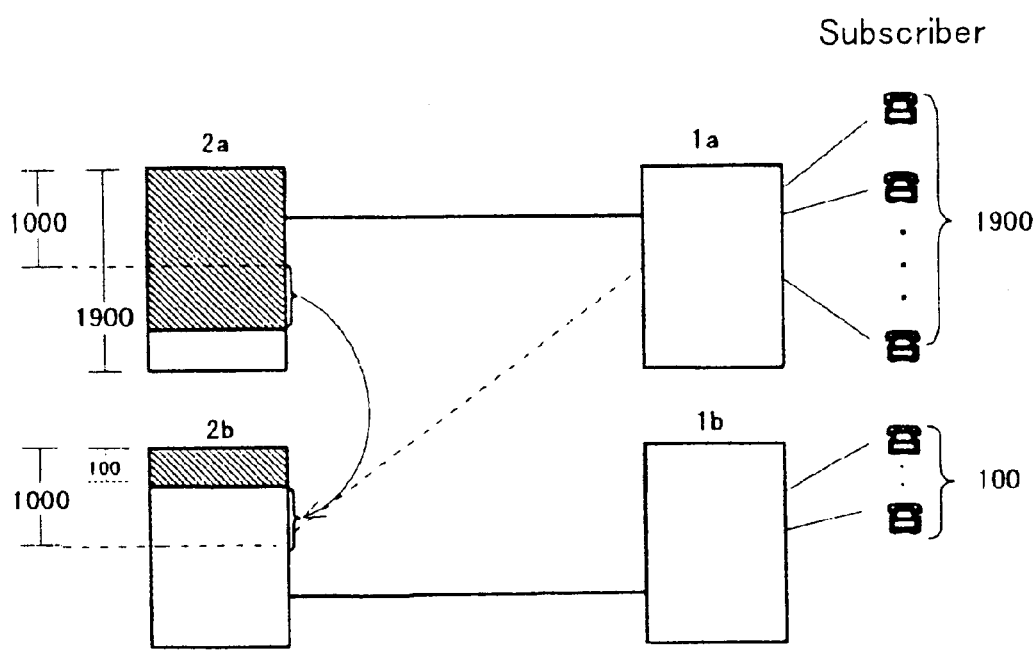
FIG. 13 is a specific diagram for explaining the objective of the present invention.

FIG. 11 is a flowchart showing the processing for the connection or the disconnection of the L-DS0/L-sub cross-connect ACM 112. In FIG. 11, for a connection the call controller 12 receives a call setup command ((SETUP command), SETUP:<L-sub#>,<L-DS0#>) via the call control DataLink from the switch in the telephone center or from the subscriber. The L-sub number (#) and the L-DS0 number (#) are designated in the SETUP command. At step S51 the call controller 12 connects the L-sub having the designated number to the L-DS0.

Therefore, in FIGS. 9 and 10, when the L-sub/P-sub cross-connect ACM 113 and the L-DS0/L-sub cross-connect ACM 112 are connected together, the addresses and the data in the three ACMs are linked together by the connection of the L-DS0/L-sub cross-connect ACM 112 at the time of the call setup. And as is described above, based on the result obtained by the processor 103, the DS0 cross-connector 102 can cross-connect the P-DS0 line and the P-sub, and the call can be set up.

For the control of a disconnection, the call controller 12 receives a call release command ((DISCONNECT command), DISCONNECT: <L-sub#>,<L-DS0#>) across the call control DataLink from the switch in the telephone center or from the subscriber. As in the SETUP command, a L-sub number (#) and a L-DS0 number (#) are designated in the DISCONNECT command. At step S52 the call controller disconnects the L-sub having the designated number from the L-DS0.

Therefore, when one of the three ACMs is disconnected, the addresses and the data of the three ACMs are not linked together, and as the P-DS0 line can not be cross-connected to the P-sub, a call is released.

When a subscriber accommodated by a specific IDT is to be accommodated by a different IDT in order to adjust the load balance between the IDTs, this can be implemented only by the rewriting of the data using a connection and a disconnection. Therefore, unlike the prior art, an inadequate, manual re-connection of a digital line to another IDT or a re-connection of a subscriber line to another RDT is not required. As a result, intervals during which the service is halted, which occur during a re-accommodation, can be reduced to the minimum.

As is described above, according to the present invention, provided is a function for cross-connecting a plurality of digital lines, which are connected to a plurality of IDTs, with a plurality of logic digital lines, which are used to identify the digital lines for the individual IDTs. With this function, the digital lines can be identified for the individual IDTs. Also provided is a function for cross-connecting a plurality of subscriber lines, which are connected to a plurality of subscribers, with a plurality of logic subscriber lines, which are used to identify the subscriber lines for the individual IDTs whereby a plurality of subscribers are accommodated. With this function, an arbitrary subscriber line can be allocated for an arbitrary logic subscriber. Furthermore, a function is provided for cross-connecting a plurality of logic digital lines with a plurality of logic subscriber lines for individual IDTs. When the above described functions are linked together, the IDT digital lines can be linked to the subscriber lines of the subscribers, and the subscribers can be accommodated by an arbitrary IDT. As a result, more IDTs can be installed to adjust for load imbalances. In addition, even when there are a plurality of communication service companies having different switches, IDTs which are connected to their switches can be connected to a single RDT, so that the RDT can be used in common.

The present invention may be embodied in other specific forms without departing from the spirit or essential characteristics thereof. The present embodiment is therefore to be considered in all respects as illustrative and not restrictive, the scope of the invention being indicated by the appended claims rather than by foregoing description and all change which come within the meaning and range of equivalency of the claims are therefore intended to be embraced therein.

What is claimed is:

1. A remote digital terminal (RDT) which connects digital lines extended from integrated digital terminals with subscriber lines extended from subscribers accommodated in the integrated digital terminals comprising:

a plurality of logical RDT sections;

first means for changeably cross-connecting the digital lines and logic digital lines which are for identifying the digital lines on each of the integrated digital terminals, the logic digital lines each corresponding to one of the logical RDT sections;

second means for changeably cross-connecting the subscriber lines and logic subscriber lines which are for identifying the subscriber lines on each of the integrated digital terminals, the logic subscriber lines each corresponding to one of the logical RDT sections; and third means for changeably cross-connecting the logic digital lines and the logic subscriber lines on each of the integrated digital terminals;

wherein each of the integrated digital terminals can be corresponded with each of the plurality of logical RDT sections and with each subscriber line.

2. A remote digital terminal (RDT) which connects with digital lines extended from integrated digital terminals and subscriber lines extended from subscribers accommodated in the integrated digital terminals comprising:

a plurality of logical RDT sections;

a terminator for terminating a first digital line extended from a first integrated digital terminal and a second digital line extended from a second integrated digital terminal;

a cross-connector for changeably cross-connecting the first digital line and a first subscriber line extended from a first subscriber accommodated in the first integrated digital terminal, and for changeably cross-connecting the second digital line and a second subscriber line extended from a second subscriber accommodated in the second integrated digital terminal;

first data for corresponding first physical identifiers for physically identifying the first and second digital line with first logic identifiers for identifying the first and second digital line on each of integrated digital terminals, the first logic identifiers each corresponding to one of the logical RDT sections;

second data for corresponding second physical identifiers for physically identifying the first and second subscriber line with second logic identifiers for identifying the first and second subscriber lines on each of integrated digital terminals, the second logic identifiers each corresponding to one of the logical RDT sections;

third data for corresponding the first logic identifiers with the second logic identifiers; and a processor for obtaining data for corresponding the first physical identifiers with the second physical identifiers based on the first, second and third data; and wherein the cross-connector cross-connects the first and second digital lines with the first and second subscriber lines respectively based on the results obtained by the processor, wherein the first, second and third data are rewritable; and wherein each of the integrated digital terminals can be corresponded with each of the plurality of logical RDT sections and with each subscriber line.

3. A digital loop carrier system comprising:

a first integrated digital terminal from which a first digital line extends;

a second integrated digital terminal from which a second digital line extends;

a remote digital terminal (RDT) including a cross-connector for changeably cross-connecting the first digital line with a first subscriber line extended from a first subscriber accommodated in the first integrated digital terminal, and changeably for cross-connecting the second digital line with a second subscriber line extended from a second subscriber accommodated in the second integrated digital terminal; the RDT further including a plurality of logical RDT sections;

first data for corresponding first physical identifiers for physically identifying the first and second digital line with first logic identifiers for identifying the first and second digital line on each of integrated digital terminals, the first logic identifiers each corresponding to one of the logical RDT sections;

second data for corresponding second physical identifiers for physically identifying the first and second subscriber line with second logic identifiers for identifying the first and second subscriber lines on each of integrated digital terminals;

third data for corresponding the first logic identifiers with the second logic identifiers the second logic identifiers each corresponding to one of the logical RDT sections; and a processor for obtaining data for corresponding the first physical identifiers with the second physical identifiers based on the first, second and third data; and wherein the cross-connector cross-connects the first and second digital lines with the first and second subscriber lines respectively based on the results obtained by the processor, wherein the first, second and third data are rewritable; and wherein each of the integrated digital terminals can be corresponded with each of the plurality of logical RDT sections and with each subscriber line.

* * * * *